United States Patent Office 3,667,883
Patented June 6, 1972

---

3,667,883
SHOE BOTTOM MOLDING APPARATUS
Herbert Ludwig, deceased, late of Uesen, near Bremen, Germany, by Friedrich Koch, Achim, near Bremen, and Hans Loewe, executors, Frankfurt am Main, Germany, assignors to Desma-Werke GmbH, Bremen, Germany
Filed June 10, 1968, Ser. No. 740,427
Int. Cl. B29h 5/12, 7/08
U.S. Cl. 425—119                             18 Claims

ABSTRACT OF THE DISCLOSURE

Injection molding apparatus embodying an open-top mold, a rotatable support for mounting two lasts for alternate disposition at a predetermined distance above the open top of the mold, a carriage mounting the rotatable support for movement vertically with respect to the mold to bring the bottom of the last located above the mold into engagement therewith for injection of bottom-forming material, and means supporting the carriage on a column for heightwise adjustment relative to the mold to accommodate lasts of different height.

---

BACKGROUND OF THE INVENTION

Injection molding apparatus designed to support one or more lasts for movement from a predetermined position above an open-top mold into engagement therewith to hold an upper on the last adjacent the mold while injecting bottom-forming composition and then lifting it away from the mold to permit removing the finished shoe is old. The principal objects of this invention are to provide an improved mounting for the last which will enable positioning either a low or a high last with an upper mounted thereon above the mold in a position for movement into engagement with the mold for the injection operation, without employing adaptors for different height lasts and without having to dismantle, substitute or replace parts whenever lasts of different height are encountered.

SUMMARY

As herein illustrated, the apparatus includes an open-top bottom mold upon which the bottom of the lasted upper is adapted to be held for the formation of a bottom by injection molding of a bottom-forming composition into the mold, a support on which lasts of different height are adapted to be mounted embodying a part movable heightwise of the mold to position the bottom of the last mounted thereon at a predetermined distance above the mold, and means mounting a last on the part for movement from said predetermined distance above the mold into engagement therewith. The support comprises a column on which the part is adapted to be moved heightwise and there is means for securing the part at a selected heightwise position. The part is a vertically elongate guide adapted to be bolted to the column and the means for mounting a last thereon is a carriage supported by the guide. The guide may be raised or lowered manually or may be moved by means of a screw mounted on the column for rotation about an axis perpendicular to the mold with its lower end rotatably fixed in the part and with its upper end threaded into a nut on the column. The part may embody a carrier plate guided for vertical movement in a vertically elongate opening in the column and preferably the screw is rotatably secured to the carrier plate to effect the desired vertical movement of the part. A motor is connected to the means for adjusting the motor in conjunction with the adjustment of the part to maintain the driving connection between the motor and the part without modifying the stroke of the motor and hence enabling using a motor of constant stroke. The means mounting a last on the part is a rotor and is adapted to mount two lasts at diametrically opposite positions for alternate movement of one or the other into a position to be lowered into engagement with the mold.

The invention will now be described in greater detail with reference to the accompanying drawings wherein.

Figure 1:
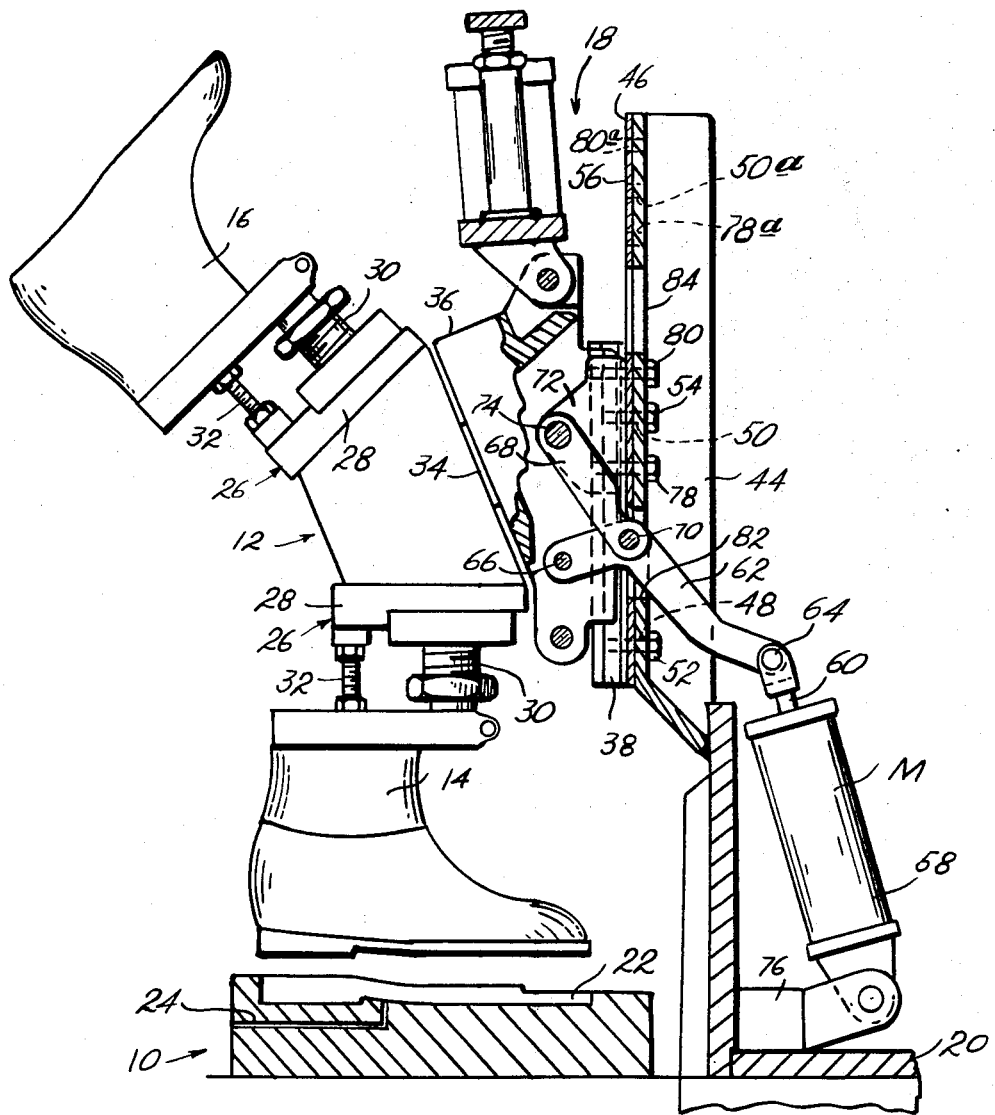
FIG. 1 is a side elevation of the apparatus, partly in section, showing the position of the last mounting means for low lasts.

Referring to the drawings there is shown an open-top bottom mold 10, last supporting means 12 situated above the mold upon which there are mounted lasts 14 and 16 for movement alternately to a position vertically above the mold preparatory to downward movement into engagement therewith, means 18 supporting the mounting means for movement relative to the mold to bring the last situated above it into engagement therewith and after the injection operation lifting it therefrom to enable removing the finished shoe, and a base 20, only a portion of which is shown herein, upon which the foregoing parts are mounted in operative relation to each other.

The bottom mold 10 is of conventional construction and contains at its upper side a mold cavity 22 of the required configuration to which the bottom-forming composition is supplied after the lasted upper has been brought down into engagement with it through an injection passage 24, one end of which is located at one end of the mold and the other end of which is located at the bottom of the cavity. Molds of this kind may be one-piece or split and may optionally comprise a ring and a sole plate movable therein to obtain different thicknesses of bottom and/or to enable applying pressure to the bottom-forming composition or to permit expansion when employing a foaming agent in the bottom composition.

The last supporting means 12 is a frusto-conical head having fixed to diametrically opposite sides jack assemblies 26, each comprising a block 28 bolted to the head, a universal coupling 30 by means of which the last may be adjusted to bring the bottom into substantial parallelism with the mold, and a locking screw 32 by means of which it may be fixed in a given position.

The supporting head 12 is fixed to a shaft 34, the latter being rotatably mounted on a carriage 36 with its axis inclined downwardly so that rotation of the head about the axis of the shaft alternately brings one or the other of the lasts into a position directly above the mold. The carriage 36 supports the head 12 for vertical movement from a position in which the bottom of the last is at a predetermined position above the mold to a position of engagement with the mold and to this end is slidably mounted on a carriage guide 38 which in horizontal section provides spaced parallel confronting channels 40—40 within which are slidably engaged transversely spaced, parallel flanges 42—42 integral with the carriage. Movement of the carriage 36 vertically in the carriage guide 38 is achieved by means of a motor M which will be described hereinafter.

To enable raising and lowering the head 12 relative to the mold to accommodate lasts of different height the carriage guide 38 is adjustably mounted on a vertically disposed column 44 rising from the base 20. The column 44 has a vertically disposed flat face 46 containing vertically spaced bolt holes 48, 50 and 50a for receiving bolts 52, 54 to bolt the carriage guide to the face of the column either at the lower position by engagement with the bolt holes 48, 50, or at the upper position by engagement with the bolt holes 50, 50a. When the carriage guide 38 is bolted at the lower position the apparatus is designed to mount low lasts and when mounted in the upper position to mount high lasts—the first position being shown in FIG. 1 and the second position being shown in FIG. 2. Optionally a hardened bearing plate 56 is mounted on the face of the column to take up wear.

As related above, movement of the carriage 36 on the column 44 to bring the bottom of the last into engagement with a mold and thereafter to lift it from the mold is achieved by a motor M which comprises a cylinder 58 containing a piston (not shown) and a rod 60 protruding from one end. The motor has a stroke of predetermined length which in conjunction with linkage comprising a lever 62 pivotally connected at one end to the protruding end of the piston rod by a pin 64 and at its other end by a pin 66 to the carriage and supported intermediate its ends by links 68 pivotally connected at one end to the lever by a pin 70 and the other end to the bracket 72 by a pin 74, provides for effecting the desired vertical movement. The motor M is pivotally connected at its lower end to a bracket 76 on the base and the bracket 72 is secured to the face of the column by bolts 78 and 80. A duplicate set of openings 78a and 80a are located at the upper end of the column so that when the carriage guide 38 is moved to the upper position the bracket 72 can be correspondingly moved upwardly on the column.

As illustrated, the motor M is located at the rear side of the column 44 with respect to the head 12 and an opening 82 is provided in the column through which the lever 62 passes for connection to the carriage. A similar opening 84 is provided at the upper part of the column to permit passage of the lever when the assembly is mounted at the upper end of the column. In this latter position the motor is pivotally supported at the upper end of a link 86 (FIG. 2), the lower end of which is pivotally connected to the bracket 76—the length of the link 86 corresponding to the difference in length between a short last and a long last. A screw 88 fixed at one end in the column and threaded into a boss on the link 86 provides for adjusting the link so as to obtain the same movement of the carriage in this position as in the lower position.

Figure 2:
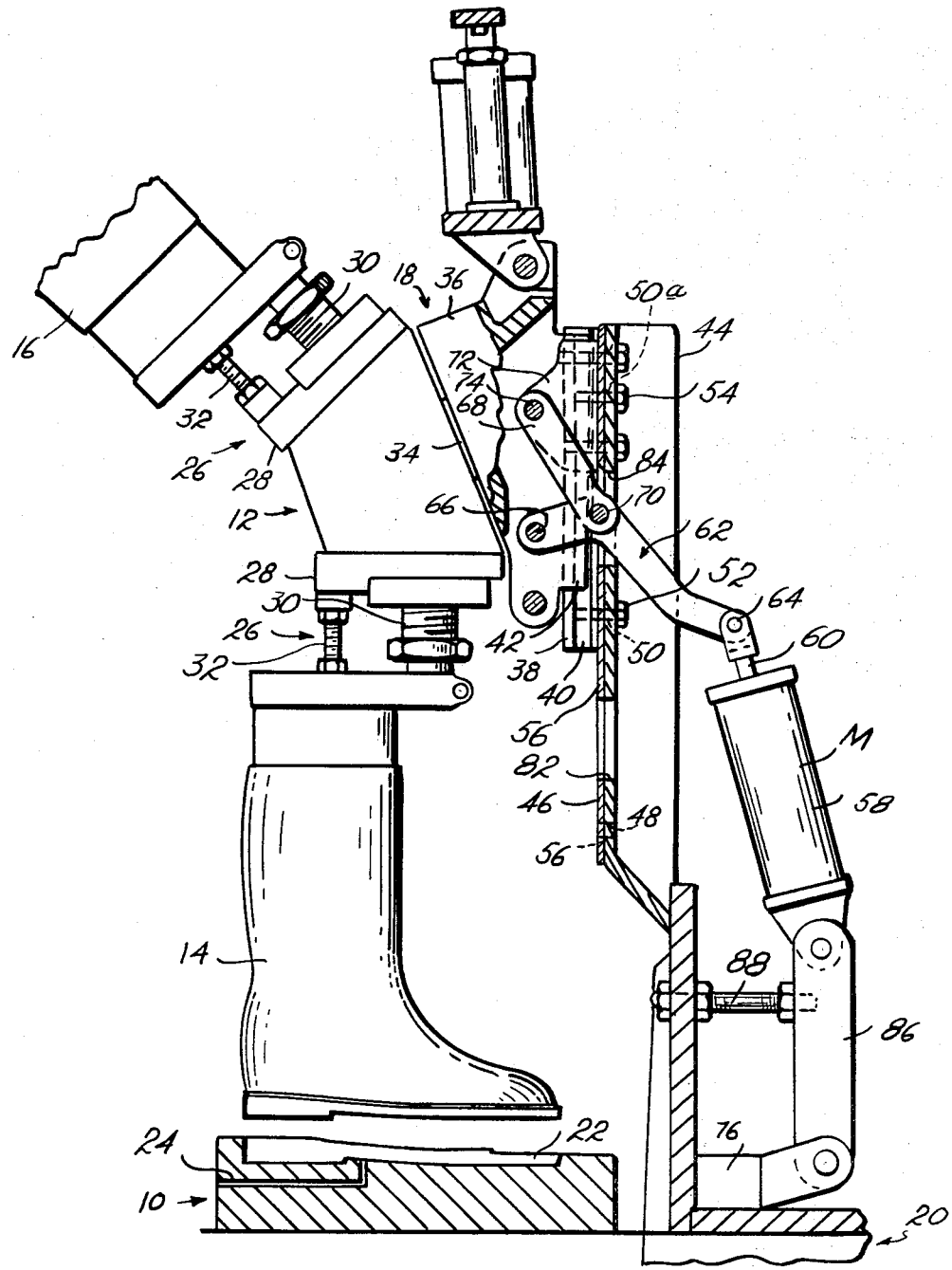
FIG. 2 is a corresponding elevation, partly in section, showing the position of the mounting means for high lasts.
Figure 3:
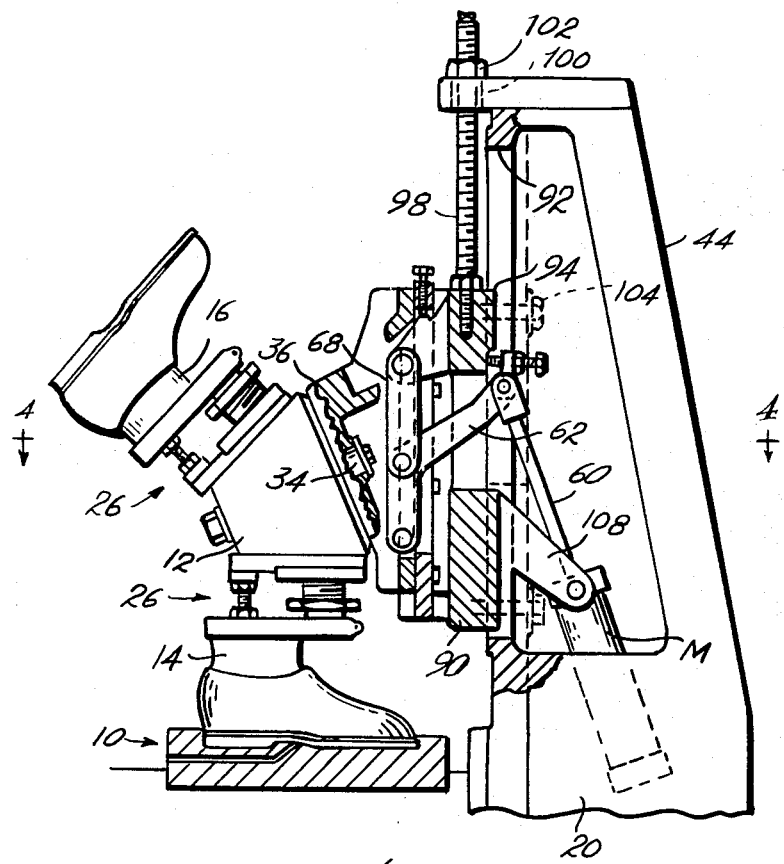
FIG. 3 is an elevation of a modification of the apparatus with the mounting means in a position for supporting low lasts.
Figure 4:
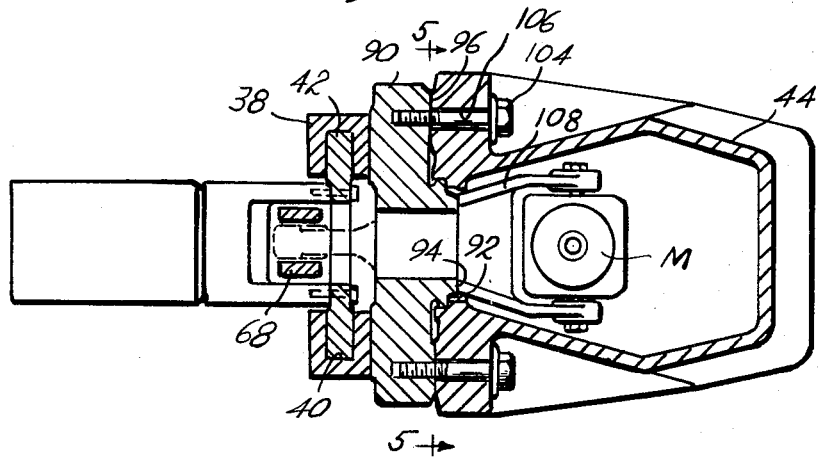
FIG. 4 is a horizontal section taken on the line 4—4 of FIG. 3.
Figure 5:
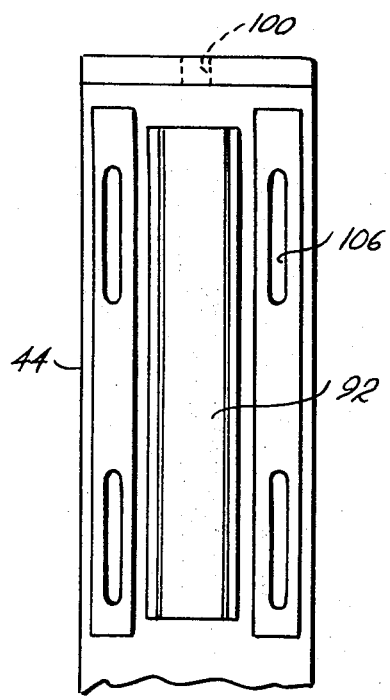
FIG. 5 is an elevation taken in the plane of the line 5—5 of FIG. 4.

A modified form of the apparatus is shown in FIGS. 3 and 4 which provides for heightwise adjustment of the last supporting assembly from low to high position and all intermediate positions without limitation. As related above, there is a bottom mold 10, a head 12 to which there are secured jack assemblies 26 for adjustably receiving the lasts 14 and 16. The head 12 is rotatably supported by means of an inclined shaft 34 on a carriage 36, the latter being provided with spaced parallel, laterally extending flanges 42—42 slidably engaged with spaced parallel channels 40—40 formed in a carriage guide 38. The carriage guide 38 in contrast to the structure shown in FIGS. 1 and 2 is bolted to the face of a slide plate 90 and the latter is supported against the face of the column 44 which rises from the base 20. The column 44 in this form of the apparatus contains centrally of its face a vertically elongate, substantially rectangular opening 92 and the slide plate 90 has a rearwardly extending, centrally located boss 94 slidably engaged within the opening 92 and flat bearing surfaces 96—96 at each side for engagement with the front face of the column by means of which the slide plate is guided in its vertical movement. A screw 98 mounted in an opening 100 at the upper end of the column, in an overlying portion projecting forwardly from the face, so as to extend downwardly parallel to the front face is rotatably fixed at its lower end to the upper end of the plate and has on it above the opening 100 a nut 102 by means of which it may be adjustably raised and lowered to in turn raise and lower the slide plate. Bolts 104 mounted in vertically elongate slots 106 in the column at opposite sides of the opening 92 and threaded into the opposite sides of the slide plate (FIG. 4) provide for clamping the slide plate in any desired heightwise position relative to the mold.

The motor M for effecting movement of the carriage 36 to raise and lower a last relative to the mold 10 in this instance is pivotally supported between spaced parallel arms 108—108 extending downwardly and rearwardly from the slide plate through the opening 92 so that vertical adjustment of the slide plate carries the motor with it and there is no need as in the previously described apparatus of repositioning the motor relative to the carriage. The piston rod 60 of the motor extends into the opening 92 in the column and is pivotally connected to the upper end of the link 62. The link passes through the opening 92 and is pivotally connected at its lower end to the carriage and intermediate its ends by the links 68 to the slide plate.

Figure 6:
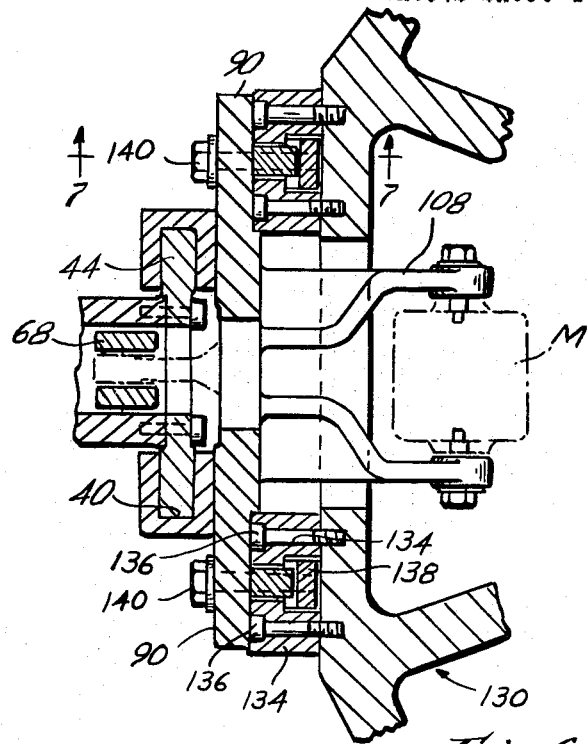
FIG. 6 is a fragmentary horizontal section, to much larger scale, showing a modification of that shown in FIG. 4.
Figure 7:
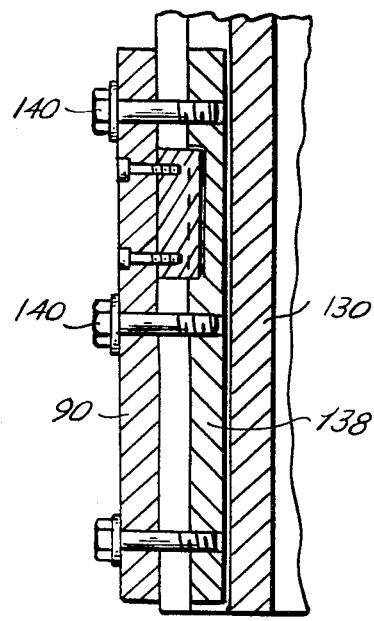
FIG. 7 is a vertical section taken on the line 7—7 of FIG. 6.
Figure 9:
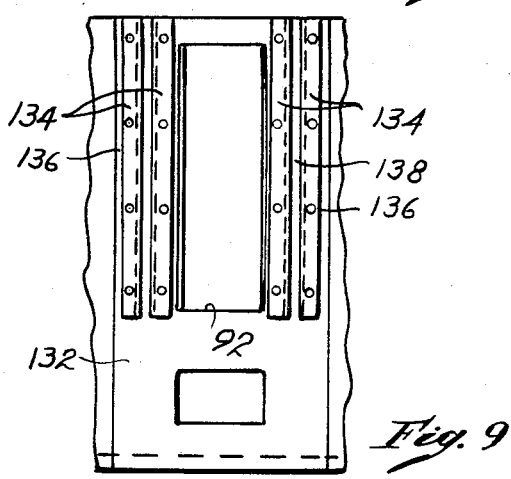
FIG. 9 is an elevation of one face of the rotor showing the means for mounting an assembly thereon.
Figure 8:
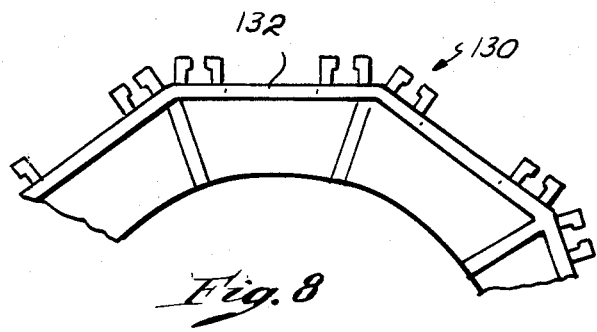
FIG. 8 is a fragmentary plan view of a rotary-type machine on which a plurality of lasts mounting assemblies are adapted to be supported for movement in succession relative to an injection mold.

It is desirable to mount a plurality of last supporting assemblies such as shown in FIGS. 1 to 4, inclusive, on a large diameter rotor 130 such as shown in FIG. 8 for rotation about a vertical axis to present the assemblies in succession to a bottom mold. Such an arrangement provides time for curing so that successive bottom-forming operations may be carried out without interruption. The rotor 130 as shown has ten vertical faces 132 on each of which there are mounted vertically spaced, parallel pairs of tracks 134—134, each track being secured to its face by bolts 136 (FIGS. 6 and 9). Between each pair of tracks 134—134 there are slidably mounted blocks 138 and the slide plate 90 is fastened against the faces of the tracks by bolts 140 which extend through the slide plate between the tracks into the blocks 138. By turning the bolts 140 in a direction to draw the blocks 138 against the inner sides of the tracks the slide plate may be locked in position and by turning them in the opposite direction to release the blocks the slide plate may be adjusted vertically.

From the foregoing it is evident that the apparatus is designed especially to enable easily processing footwear of different size, that is low shoes, high shoes and even boots without extensive alteration of the apparatus or the substitution or addition of parts thereto and that the adjustment necessary to achieve the results required are relatively simple and can be performed without requiring the services of a shop mechanic.

It should be understood that the present disclosure is for the purpose of illustration only and that this invention includes all modifications and equivalents falling within the scope of the appended claims.

It is claimed:

1. In a shoe bottom molding machine, an open top bottom mold upon which the bottom of a lasted upper is adapted to be held for formation of a bottom thereto by injection of a bottom-forming composition into the mold, a support on which both low and high lasts are adapted to be mounted, said support embodying a part positionable between first and second positions heightwise of the mold to position the bottom of the last mounted thereon at a distance above the mold, a carriage heightwise movably supported upon said part, and means for effecting said heightwise motion of said carriage for movement of said last mounted on said carriage from said distance above the mold into engagement therewith.

2. Apparatus according to claim 1, wherein said support comprises a column on which the part is adapted to be positioned heightwise, and means for securing the part at a selected heightwise position.

3. Apparatus according to claim 1, wherein said support comprises a column on which the part is adapted to be positioned heightwise, and means for securing the part at a selected heightwise position comprising vertically elongate slots in the column and bolts secured through said slots to the part.

4. Apparatus according to claim 1, wherein said part is a vertically elongate guide adapted to be bolted to the column at different heightwise positions.

5. Apparatus according to claim 2, wherein a screw supports the part for heightwise movement on the column.

6. Apparatus according to claim 3, wherein the column has a vertical face containing a vertically elongate opening, the part has a boss on it slidably engaged with said opening by means of which it is guided, a lead screw is mounted on the column for rotation about an axis parallel to the front face of the column with its lower end rotatably fixed to the part and with its upper end threaded into a nut supported on the column, said nut being rotatable to position heightwise said part.

7. Apparatus according to claim 1, wherein the part is a guide having spaced parallel tracks and said carriage has spaced parallel flanges slidably engaged with said tracks.

8. Apparatus according to claim 5, wherein the part embodies a carrier plate to which it is attached and which plate is supported by said screw, said carrier plate is mounted on the column for heightwise adjustment to dispose said last with its bottom at said position above the mold.

9. Apparatus according to claim 8, wherein said means for securing the part at a selected heightwise position includes fastening means for securing the carrier plate at a predetermined heightwise position on the support.

10. Apparatus according to claim 8, comprising means mounting a motor on the carrier plate for positionment heightwise of the support with the part.

11. Apparatus according to claim 1, wherein said means for effecting said heightwise motion of said carriage comprises a motor and means connecting the motor to said carriage.

12. Apparatus according to claim 11 in which said motor has a stroke of constant length.

13. Apparatus according to claim 1, wherein said means for effecting said heightwise motion of said carriage comprises a motor and linkage connecting the motor to said carriage, and means for repositioning the motor and linkage on the support with adjustment of the part on the support to maintain the driving connection between the motor and said means mounting the last on the support constant.

14. Apparatus according to claim 1, wherein the carriage includes a rotor mounting two lasts diametrically opposite each other on the part for rotation relative to the mold for alternate disposition of the two lasts above the mold.

15. In a shoe bottom molding machine, an open top mold and a supporting assembly for positioning a last according to its height at a position above the mold preparatory to lowering it from said position into engagement with the mold for injection, said assembly comprising a column supported adjacent the mold, a carriage guide repositionably mounted on the column for movement thereon heightwise of the mold, a carriage on the carriage guide movable thereon relative to the carriage guide heightwise of the mold, said carriage being adapted to support a last, a motor having a piston rod protruding from one end, linkage comprising a bent lever having an elbow intermediate its ends, said bent lever being pivotally connected at one end to the protruding end of the piston rod and at its other end to the carriage, a link connected at one end to the elbow, and means at the other end of the link and at the other end of the motor for repositioning the linkage and the motor on the column in proportion to the repositioning of the carriage guide thereon.

16. A machine according to claim 15, wherein the means for repositioning the linkage comprises a bracket on the column and the means for repositioning the motor comprises an extension link interposable between the other end of the motor and the column.

17. Apparatus according to claim 15, wherein a slide supports the carriage guide for movement heightwise of the column, and the motor and linkage are mounted on and movable with the slide.

18. Apparatus according to claim 15, comprising a rotor supported for rotation about a vertical axis, said rotor mounting a plurality of said assemblies for movement in succession to position one assembly at a time above the mold.

References Cited

UNITED STATES PATENTS

| | | | |
|---|---|---|---|
| 2,689,375 | 9/1954 | Hugger | 18—175 X |
| 2,830,324 | 4/1958 | Farmer | 18—175 X |
| 2,878,523 | 3/1959 | Hardy | 18—175 X |
| 3,018,517 | 1/1962 | Ludwig | 18—175 |
| 3,063,096 | 11/1962 | Hardy | 18—175 |
| 3,255,491 | 6/1966 | Hardy | 18—175 |
| 3,343,219 | 9/1967 | Wilcox et al. | 18—175 |
| 3,343,223 | 9/1967 | Ludwig | 18—175 X |
| 3,358,333 | 12/1967 | Kitchener et al. | 18—175 X |
| 3,443,279 | 5/1969 | McIlvin et al. | 18—175 |

J. HOWARD FLINT, Jr., Primary Examiner

U.S. Cl. X.R.

425—125, 126, 127